(12) United States Patent
Fu (10) Patent No.: US 9,700,099 B2
(45) Date of Patent: *Jul. 11, 2017

(54) FOOTWEAR ARTICLE (71) Applicant: David Fu, Hksar (CN)

(72) Inventor: David Fu, Hksar (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/721,937

(22) Filed: May 26, 2015

(65) Prior Publication Data

US 2015/0327621 A1 Nov. 19, 2015

Related U.S. Application Data (63) Continuation of application No. 14/042,229, filed on Sep. 3, 2013, now Pat. No. 9,055,783, which is a (Continued)

(30) Foreign Application Priority Data

Nov. 9, 2007 (WO) ............ IB2007/003419
Nov. 7, 2008 (WO) ............ IB2008/002987

(51) Int. Cl.
*A43B 13/18* (2006.01)
*A43B 13/12* (2006.01)
(Continued)

(52) U.S. Cl.
CPC ............ *A43B 13/189* (2013.01); *A43B 3/108* (2013.01); *A43B 3/128* (2013.01); *A43B 7/144* (2013.01);
(Continued)

(58) Field of Classification Search
CPC ..... A43B 13/189; A43B 13/12; A43B 13/141; A43B 13/16; A43B 13/188; A43B 3/10; A43B 3/107; A43B 3/108
See application file for complete search history.

(56) References Cited

U.S. PATENT DOCUMENTS 4,348,821 A * 9/1982 Daswick ............... A43B 13/12
36/103
4,551,930 A 11/1985 Graham et al.
(Continued)

FOREIGN PATENT DOCUMENTS

CN 2196905 Y 5/1995
CN 1406115 A 3/2003
(Continued)

OTHER PUBLICATIONS

Office Action issued by the U.S. Patent and Trademark Office in the U.S. Appl. No. 12/741,942, mailed Mar. 29, 2013, U.S. Patent and Trademark Office, Alexandria, VA. (11 pages).
(Continued)

*Primary Examiner* — Ted Kavanaugh
(74) *Attorney, Agent, or Firm* — Buchanan Ingersoll & Rooney PC (57) ABSTRACT

A footwear article comprising a generally elongate sole for engagement with and support of the foot of a person, said sole having an upper surface, a lower surface, a first portion being for interaction with at least the heel region of the foot of the person and a second portion for interaction with at least the metatarsal region of the foot of the person; and a foot engagement means for securing the footwear article to the foot of a person. The footwear article being characterized in that a first portion of the sole includes a first material having a first material property and the a second portion of the sole includes a second material having a second material property; and said first portion and said second portion extend at least to the upper surface of the sole and first material property provides for dampening of load imparted to the foot of the person upon contact with a surface.

16 Claims, 7 Drawing Sheets

Related U.S. Application Data continuation of application No. 12/741,942, filed as application No. PCT/IB2008/002987 on Nov. 7, 2008, now abandoned.

(51) Int. Cl.
   *A43B 7/32*    (2006.01)
   *A43B 13/14*   (2006.01)
   *A43B 3/10*    (2006.01)
   *A43B 3/12*    (2006.01)
   *A43B 7/14*    (2006.01)
   *A43B 13/16*   (2006.01)
   *B29D 35/12*   (2010.01)

(52) U.S. Cl.
   CPC .............. *A43B 7/1445* (2013.01); *A43B 7/32* (2013.01); *A43B 13/12* (2013.01); *A43B 13/141* (2013.01); *A43B 13/16* (2013.01); *A43B 13/188* (2013.01); *B29D 35/122* (2013.01)

(56) References Cited

U.S. PATENT DOCUMENTS

| | | | | |
|---|---|---|---|---|
| 4,760,655 | A * | 8/1988 | Mauch | A43B 7/1425 36/141 |
| 4,798,010 | A * | 1/1989 | Sugiyama | A43B 13/12 36/28 |
| 6,516,539 | B2 | 2/2003 | Nishiwaki et al. | |
| 2001/0008678 | A1 * | 7/2001 | Hoffman | A43B 13/181 428/138 |
| 2003/0070321 | A1 | 4/2003 | Davis et al. | |
| 2004/0045193 | A1 | 3/2004 | Peetsch et al. | |
| 2004/0194342 | A1 | 10/2004 | Steinberg | |
| 2005/0039349 | A1 | 2/2005 | Grisoni et al. | |
| 2005/0193591 | A1 | 9/2005 | Bauerfeind et al. | |
| 2006/0130364 | A1 | 6/2006 | Greene et al. | |
| 2006/0230643 | A1 | 10/2006 | Affleck | |
| 2007/0033833 | A1 * | 2/2007 | Chang | A43B 7/1445 36/30 R |
| 2007/0151124 | A1 | 7/2007 | Chan | |
| 2007/0175065 | A1 * | 8/2007 | McDonald | A43B 3/126 36/11.5 |
| 2008/0222918 | A1 | 9/2008 | Hesse | |
| 2008/0271340 | A1 | 11/2008 | Grisoni et al. | |
| 2009/0025254 | A1 * | 1/2009 | Smith | A43B 7/141 36/44 |
| 2010/0205831 | A1 | 8/2010 | Cheskin et al. | |

FOREIGN PATENT DOCUMENTS

| | | |
|---|---|---|
| DE | 27 09 546 A1 | 9/1978 |
| DE | 199 33 752 A1 | 2/2000 |
| DE | 20 2004 002 870 U1 | 5/2004 |
| EP | 1642512 A1 | 4/2006 |
| FR | 1.351.722 A | 2/1964 |
| FR | 2 548 876 A1 | 1/1985 |
| JP | 43-25333 Y1 | 10/1968 |
| JP | 2002-17401 A | 1/2002 |
| WO | WO 84/02259 A1 | 6/1984 |
| WO | WO 00/13537 A2 | 3/2000 |
| WO | WO 2005/089580 A1 | 9/2005 |
| WO | WO 2007/126187 A1 | 8/2007 |

OTHER PUBLICATIONS

Extended European Search Report issued Jun. 25, 2013, by the European Patent Office in corresponding European Patent Application No. 08848124.7. (5 pages).

First Office Action issued on Nov. 28, 2013, by the Chinese Patent Office in corresponding Chinese Patent Application No. 200880124423.7, and an English Translation of the Office Action. (18 pages).

Extended European Search Report issued May 29, 2013, by the European Patent Office in corresponding European Patent Application No. 08847935.7. (7 pages).

* cited by examiner

FOOTWEAR ARTICLE

FIELD OF THE INVENTION

The present invention relates to the field of footwear articles, in particular to footwear of composite form.

BACKGROUND OF THE INVENTION

It is well known in the art that shock loadings and forces applied to the underside of the foot of a person via the sole of footwear article have long term effects on the integrity of joints of a person, whilst also at times causing pain and discomfort, in particular when wearing footwear for extended periods of time.

Furthermore, it is well known that the majority of loading on impact to the foot of a person is imparted to the underside of the heel portion of the foot of a person in use.

Footwear articles of the prior art include various manners in which to increase comfort and conformity to the foot of user, including shock absorptive inserts, various types of foam rubber and air cushioning devices. Such footwear articles typically require increased manufacturing costs and tooling, thus increasing complexity of production.

The present invention is provides a footwear article which overcomes or at least substantially ameliorates at least some of the deficiencies as exhibited by those of the prior art.

SUMMARY OF THE INVENTION

In a first aspect, the present invention provides a footwear article comprising:
- a generally elongate sole for engagement with and support of the foot of a person, said sole having an upper surface, a lower surface, a first portion being for interaction with at least the heel region of the foot of the person and a second portion for interaction with at least the metatarsal region of the foot of the person; and
- a foot engagement means for securing the footwear article to the foot of a person.
- characterised in that a first portion of the sole includes a first material having a first material property and the a second portion of the sole includes a second material having a second material property; and
- said first portion and said second portion extend at least to the upper surface of the sole and first material property provides for dampening of load imparted to the foot of the person upon contact with a surface.

Preferably the first portion further provides for interaction with and at least partial support of the plantar arch of the user.

Preferably the first portion extends substantially laterally across the sole.

Alternatively, the first portion is provided as a first part and a second part and laterally spaced apart such that the first part provides for interaction with the lateral inferior of the heel of the person and the second part provides for interaction with the medial inferior aspect of the heel of the user. The first part and the second part of the first portion are preferably sized and selected from a material so as to provide lateral stabilisation and load distribution of the heel of the person.

The first material property and the second material property may differ from each other and the first material and the second material may differ from each other, and the first material and the second material have differing densities.

The first portion and the second portion are preferably selected from the group including polymeric materials, rubbers, elastomers and organic materials or combinations thereof.

Preferably the first material and the second material are selected from the group including thermoplastic polymeric material, co-polymers and mixed polymer blends.

The first material and the second material are preferably selected from the group including polyurethane, ethylene vinyl acetate, poly vinyl acetate and the like.

The first material and the second material may be provided in the form of expanded form, compact form or gel form of combinations thereof.

Preferably the first material is a polyurethane gel and the second material is an expanded poly vinyl acetate material.

The engagement means is preferably selected from the group including straps, an enclosure, a buckle or the like.

Preferably the sole is formed as a unitary construct by co-molding the first portion and the second portion. The sole is preferably formed as a unitary construct whereby the first portion and the second portion are joined together by an adhesive bonding agent, contact cement pressure or heat activated film or the like.

The upper surface of the sole is preferably provided as a substantially continuous surface and formed by at least part of the first portion and the second portion of the sole, and the first portion preferably extends partially towards the lower surface of the sole. Alternatively, the first portion may extend through the sole to the lower surface of the sole.

The upper surface is preferably of concave form and the sole includes a peripheral lip extending at least partially along the periphery of the sole so as to provide a contoured upper surface configured to receive the underside of the foot of the person.

The footwear article may further include a cushioning member located within the sole.

The first portion of the sole may be provided as a multi-layered gel construct.

The sole may further include a third portion which extends to the upper surface of the sole and having material property provides for dampening of load imparted to the foot of the person upon contact with a surface, said third portion providing for interaction with at least the metatarsal region of the foot of the person.

Preferably the footwear article is provided in the form of a "flip-flop" type footwear article. Alternatively, the article may be provided in the form of a "sandal" type footwear article, or as an at least partially enclosed footwear article.

Alternatively, the article may be provided as a heeled article such that the upper surface of the sole is inclined in a direction of from the upper surface towards the lower surface in a direction of from the first portion towards the second portion, and the third portion is located in a portion to substantially prevent or reduce movement of the foot of the person along the upper surface of the sole. The third portion may be located so as to be at adjacent the ball of the underside of the foot of the person.

In another aspect, the present invention provides a footwear article comprising:
- a generally elongate sole for engagement with and support of the foot of a person, said sole having an upper surface, a lower surface, a first portion being for interaction with at least the heel region of the foot of the person and a second portion for interaction with at least the metatarsal region of the foot of the person; and
- a foot engagement means for securing the footwear article to the foot of a person.

characterised in that a first portion of the sole includes a first material having a first material property and the a second portion of the sole includes a second material having a second material property, first material property providing for dampening of load imparted to the foot of the person upon contact with a surface.

Preferably, said first material is a gel type polymeric material and said second material is an expanded polymeric material, the sole is preferably formed as a unitary molded structure, and said first portion and said second portion co-operatively form a flexible sole.

Preferably a part of the first portion and a part of the second portion form the upper surface of the sole.

In a further aspect, the present invention provides a footwear article comprising:
  a generally elongate sole comprising a first portion and a second portion and having an upper surface and a lower surface, said first portion being for direct contact and interaction with at least a portion of the underside of the foot of the person and being formed from a first polymeric material having a first density; and said second portion forming substantially the entire lower surface and being for direct contact and interaction with a surface and being formed from a second polymeric material having a second density; and
  a generally elongate and flexible foot engagement means for securing the footwear article to the foot of a person, said foot engagement being engaged directly with at least said second portion and configured so as to extend over a portion of the upper side of the foot of the person;
  wherein the first polymeric material and the second polymeric material are selected and the first portion and the second portion are sized and arranged such that the sole is substantially flexible and elastic so as to allow for substantial flexion of the sole longitudinally and return, when in use and during ambulation of the person;
  wherein the first polymeric material and the second polymeric material are selected and the first portion and the second portion are sized and arranged such that dampening is provided upon load being imparted to the foot of the person upon contact with the surface; and
  wherein the sole is formed as a unitary construct by co-molding the first portion and the second portion together, and the first polymeric material and the second polymeric material are suitably selected for said co-molding.

The first density is preferably greater than the second density, and the first material is preferably provided in a gel form and the second polymeric material is preferably provided in an expanded form.

In a preferred embodiment, the foot engagement means is a "thong" type engagement means, and the footwear article is provided in the form of a "flip-flop" type footwear article.

The first polymeric material and the second polymeric material may be selected from the group including thermoplastic polymeric materials, co-polymers and mixed polymer blends, more preferably from the group including polyurethane, ethylene vinyl acetate, poly vinyl acetate and the like.

In a preferred embodiment, the first material is a polyurethane gel material and the second material is an expanded polyurethane material.

The first portion may extend substantially laterally across upper surface of the sole and substantially form the rear part of the upper surface of the sole, and the second portion may form at least a part of the front part of the upper surface of the sole.

Alternatively, the first portion may form at least part of the front part of the upper surface of the sole, and the second portion may form at least a part of the rear part of the upper surface of the sole.

In an alternate embodiment, the first portion may form substantially the entire upper surface of the sole The first portion may further provide for interaction with and at least partial support of the plantar arch of the user.

In other embodiments, the first portion may be provided as a first part and a second part and laterally spaced apart such that the first part provides for interaction with the lateral inferior of the metatarsal region of the foot of the person and the second part provides for interaction with the medial inferior aspect of the metatarsal region of the foot of the person. The first part and the second part of the first portion may be sized and selected from a material so as to provide lateral stabilisation and load distribution of the heel of the person.

In further embodiments, the upper surface may be of concave form and the sole may include a peripheral lip extending at least partially along the periphery of the sole so as to provide a contoured upper surface configured to receive the underside of the foot of the person.

BRIEF DESCRIPTION OF THE DRAWINGS

Preferred embodiments of the present invention will be explained in further detail below by way of examples and with reference to the accompanying drawings, in which:—

FIG. 1b is an underside view of the embodiment of the invention as depicted in FIG. 1a;

FIG. 2b is an underside view of the schematic representation depicted in FIG. 2a;

DETAILED DESCRIPTION OF THE PREFERRED EMBODIMENTS

Referring to FIGS. 1a to 1c and FIGS. 2a to 2h, an exemplary embodiment of a footwear article 100 according to the present invention is shown. In the present embodiment, the footwear article 100 is provided in the form of a "flip-flop" type article, however other articles or other or alternate embodiments are also applicable to the invention, such as a sandal, slip-on type shoes or the like.

Figure 1A:
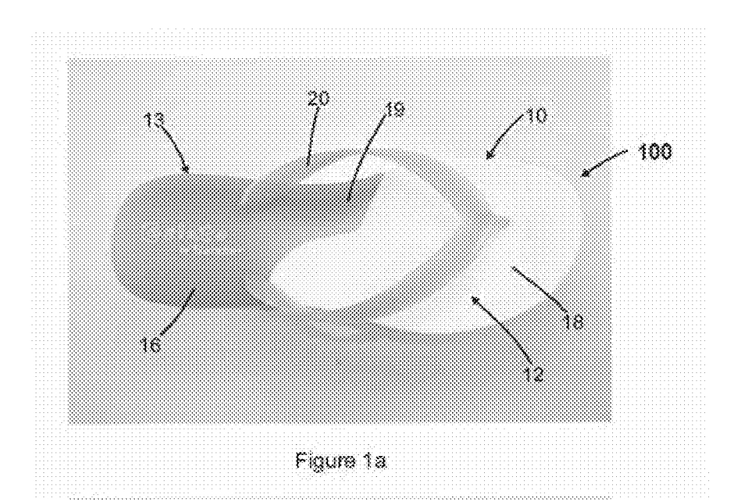
FIG. 1a is a plan view of an exemplary embodiment of a footwear article according to the present invention.
Figure 1B:
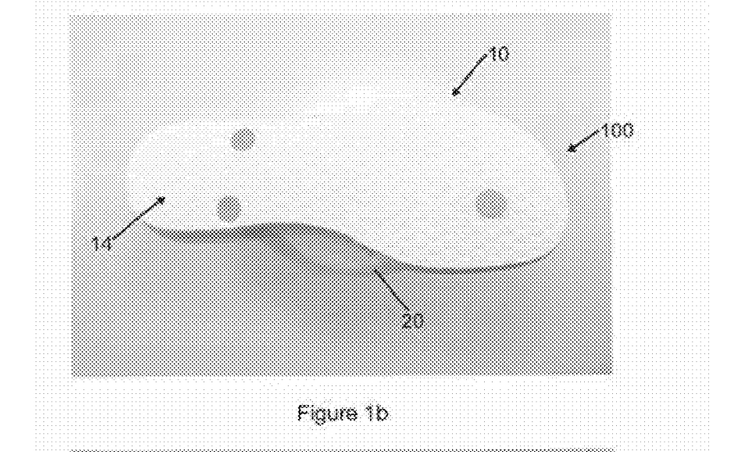
Figure 1C:
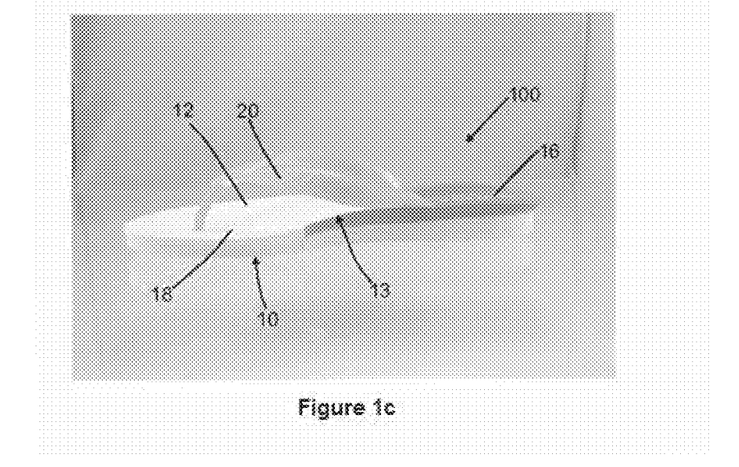
FIG. 1c is a side view of the embodiment of the invention as depicted in FIGS. 1a and 1b.
Figure 2A:
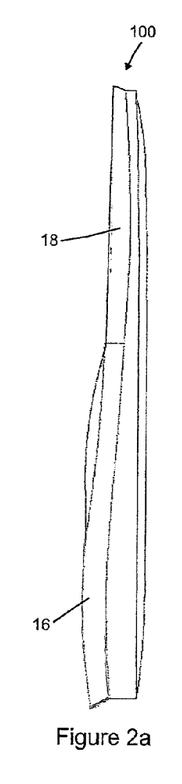
FIG. 2a depicts an inside view of a schematic representation of the present invention.
Figure 2B:
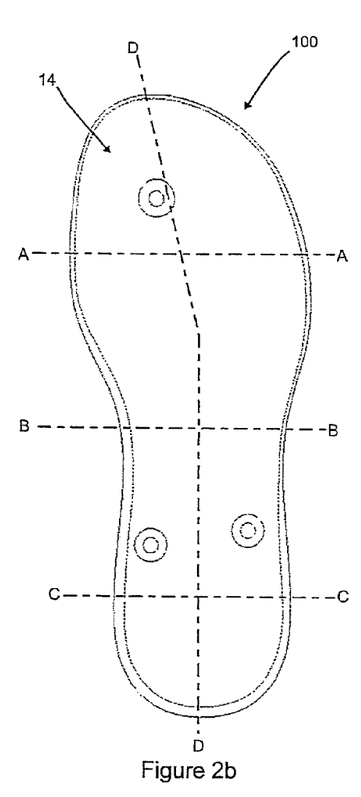
Figure 2C:
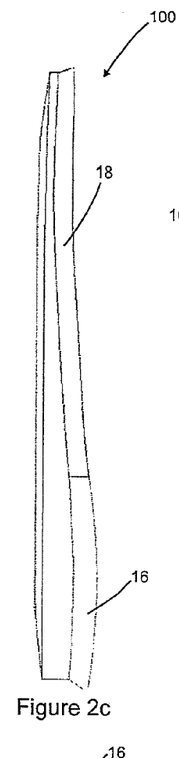
FIG. 2c is an outside view of the schematic representation of the present invention depicted in FIGS. 2a and 2b.
Figure 2D:
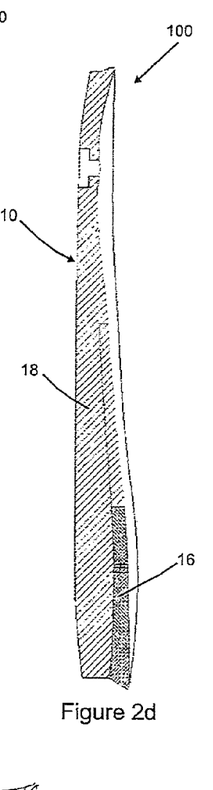
FIG. 2d is a section view through line D-D of FIG. 2b.
Figures 2E, 2H:
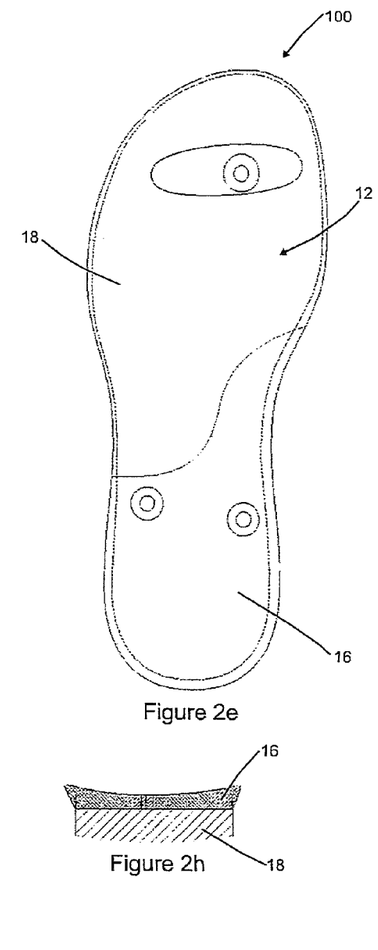
FIG. 2e is a plan view of the schematic representation depicted in FIGS. 2a to 2d.
FIG. 2h is a section view through line C-C of FIG. 2b.
Figure 2F:
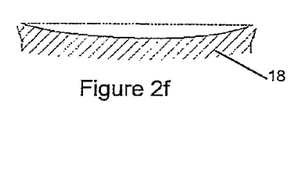
FIG. 2f is a section view through line A-A of FIG. 2b.
Figure 2G:
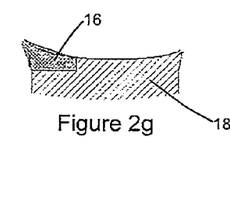
FIG. 2g is a section view through line B-B of FIG. 2b.

The article 100 is provided as a generally elongate sole 10 which, in the present invention, is provided as two portions, a first portion 16 and a second portion 18, although those skilled in the art will appreciate that the article 100 may be provided as further portions without departing from the invention.

A foot engagement means 20 is provided which is provided so as to co-operatively secure the article 100 to the foot of a person. Although depicted as a typical "flip flop" engagement device, those skilled in the art shall appreciate that other engagement devices such as straps, buckles, cross-overs or the like are equally applicable to the invention. Co-operatively with the sole 10, the engagement means 20 secures the article 100 to the foot of a person.

The engagement means 20 is affixed to the sole 10 of the article via apertures extending through the sole 10, the engagement means 20 having formations for abutting against and within recesses within the underside 14 of the sole 10. Again, those skilled in the art will understand that various engagement means may secured to the sole 10 in other manners where applicable.

The first portion 16 is positioned and formed from a material suitable for providing cushioning or dampening to the heel of a person when standing or during walking. The second portion 18 provides for support of the front portion or metatarsal portion of the foot of a person.

The sole 10 is provided with a concave upper surface 12 which is suitably contoured so as to provide for comfort of fit to the foot of a user when wearing the article 100. A peripheral lip 13 is provided which extends around the periphery of the sole 10 again providing for comfort to a user and for foot conformity.

In the present embodiment, the first portion 16 further extends as a medical portion 19 to provide arch support to the foot of a person. Those skilled in the art will appreciate that other geometries and positioning of the first portion 16 may be provided in other or alternate embodiments so as to provide cushioning to the underside of the foot of a person, without departing from the scope of the invention.

The first portion 16 of the sole 10 is formed from a gel-type polymeric material, in the present embodiment a polyurethane gel material, the visco-elastic properties of which provide for cushioning and shock absorption to the heel portion of a user. The second portion 18 of the sole 10 is formed from a further polymeric material, in the present embodiment expanded polyurethane, which is integrally formed with the first portion 10. The second portion of the present embodiment forms the majority of the sole, the flexural properties in conjunction with suitable sizing provides for significant flexing of the sole when walking and again increases comfort to a use.

In the present embodiment of the article 100, the first portion 16 and the second portion 18 are integrally formed by a co-molding process so as to provide continuity between the portions 16 and 18. A co-molding process, as will readily be understood by those skilled in the art, is whereby the portions are molded together and are generally formed with a common mold.

By being formed as a co-molded sole 10, the present invention provides for continuity of the sole 10 to be formed as a unitary construct, allowing for ease of form and providing for continuity of the upper surface 12 of the sole, thus allowing for direct contact of the underside of the foot of a user and also provides for ease of formation and manufacturing. Further, by providing a unitary construct such that the sole 10 is substantially formed in total by the first portion 16 and the second portion 18, ease and simplicity of formation and manufacture is achieved.

In other or alternate embodiments, the sole 10 may be formed by adhering the first portion 16 and the second portion 18 together by adhesives, pressure or heat sensitive glues or the like, where applicable.

Although in the present embodiment, the first portion 16 and the second portion 18 are formed from a polyurethane gel and expanded polyurethane material respectively, those skilled in the art that other polymer or thermoplastic materials may also be utilised, such as poly vinyl acetate materials or other such suitable polymeric materials.

Alternatively, in other embodiments and as would be understood by those skilled in the art, other materials such as rubbers, elastomers, organic materials or combinations thereof, and co-polymer and mixed polymer blends and combinations thereof may also be utilised. Further, materials may be provided in the form of compact polymers, expanded polymeric materials or gel materials or combinations thereof and may be used in various combinations without departing from the scope of the invention. Furthermore, the sole 10 may be provided as a single material having varying densities so as to provide a first portion with appropriate cushioning whilst being of a expanded form for example for other parts of the sole so as to provide for structural integrity.

Furthermore, in other or alternate embodiments of the invention, the first portion 16 may be provided so as to provide medial or lateral support to the heel of a user so as to more evenly distribute load to the heel and to prevent exacerbated medial or lateral wear of the rear portion of the sole 10. In other embodiments, the first portion may be provided as two or more discrete parts spaced laterally apart form each other and suitably located and sized so as to provide for more even loading and increased stabilisation to the underside of the foot of a user.

In the present embodiment, the first portion 16 is provided so as to extend partway through the sole 10 towards the lower surface 14. However, in other embodiments, the first portion 16 may extend to a greater or lesser extent through the thickness of the sole 10. Further, the first portion 16 is provided so as to extend the full width of the sole 10 in the present embodiment, however again, the first portion 16 may extend partway across the sole 10 in other embodiments.

In the present embodiment, the article 100 is depicted as a substantially planar "flip-flop" type footwear article, however, in other or alternate embodiments the article 100 may be provided with a raised heel, such as for women's type footwear. Further, as will be appreciated, the first portion 16 may be provided as a plurality of layers either in the direction between the upper and lower surface or laterally, and each layer may be provided with differing colours.

In other embodiments, cushioning elements such as "air cushioning" elements may be incorporated within the sole to provide for additional cushioning to the foot of a user.

Figure 3A:
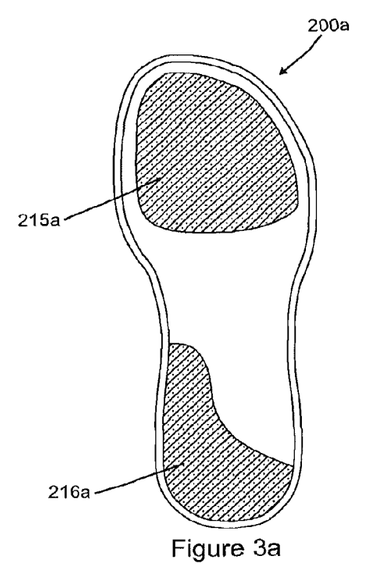
FIG. 3a is a plan view of a first schematic representation of an embodiment of the present invention.

Referring to FIG. 3a, there is shown an embodiment 200a of the invention whereby a third portion 215a is provided towards the metacarpal portion of a user's foot to provide for cushioning to the front portion of the foot of a user. The third portion may be formed from same of different materials as that of the first portion 216a.

Figure 3B:
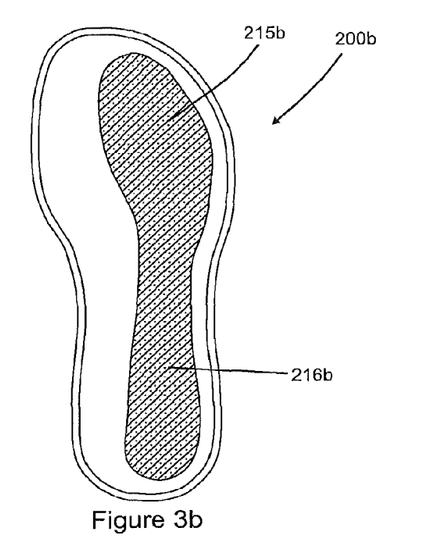
FIG. 3b is a plan view of a second schematic representation of an embodiment of the present invention.

In another embodiment of the footwear article 200b as shown in FIG. 3b, the first portion 216b and the second portion 216 are integrally formed, and co-operatively provide for lateral support of the underside of the foot of a user.

Figure 3C:
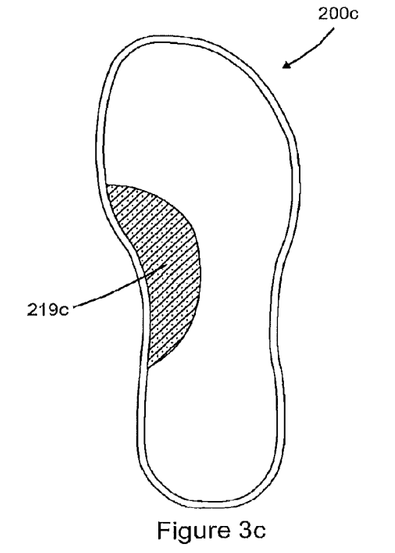
FIG. 3c is a plan view of a third schematic representation of an embodiment of the present invention.

Referring to FIG. 3c, and embodiment of the footwear article 200c is shown whereby a portion 219c of the first portion provides for medial arch support.

Figure 3D:
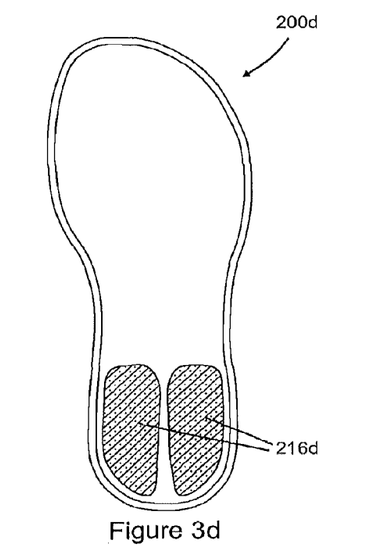
FIG. 3d is a plan view of a fourth schematic representation of an embodiment of the present invention.

In a further embodiment of a footwear article 200d according to the present invention as depicted in FIG. 3c, the first portion 216d is provided as two separate parts being spaced apart laterally so as to provide for increased medial or lateral support and cushioning to the underside of the heel portion of the foot of a user.

Figure 3E:
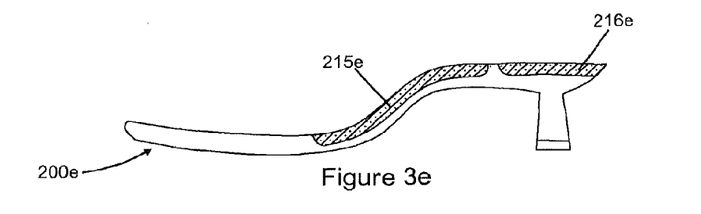
FIG. 3e is a side view of a further embodiment of the present invention.

FIG. 3e depicts yet another embodiment of a footwear article 200e according to the present invention whereby the article 200e is provided with a raised heel. The first portion 216e provides for cushioning of the heel of a user whilst a third portion 215e is provided for contact with the ball of the foot of a user, which provides resistance and reduces the incidence or likelihood of the foot of the user sliding down the inclined surface.

Figure 4A:
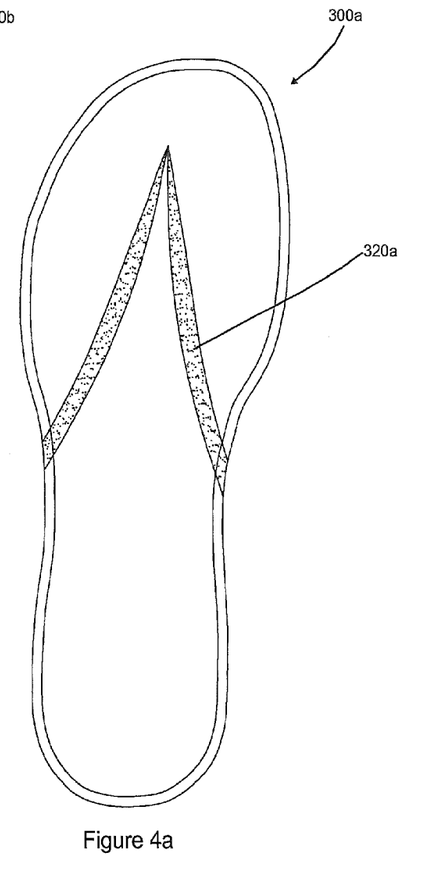
FIG. 4a is a plan view of a first schematic representation of a further embodiment of the present invention.
Figure 4B:
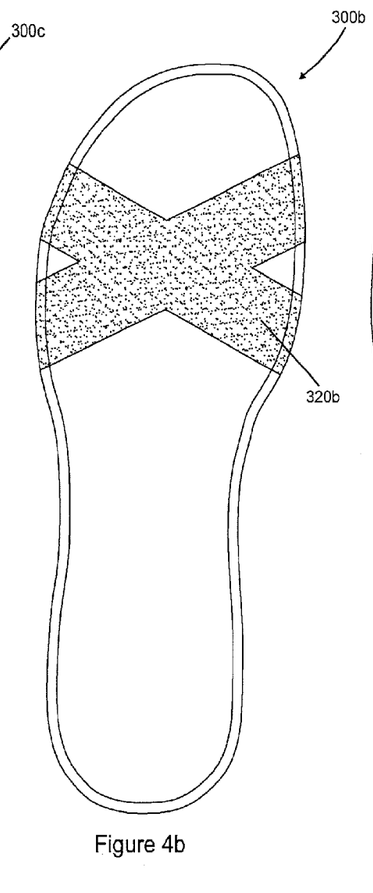
FIG. 4b is a plan view of a second schematic representation of a further embodiment of the present invention.
Figure 4C:
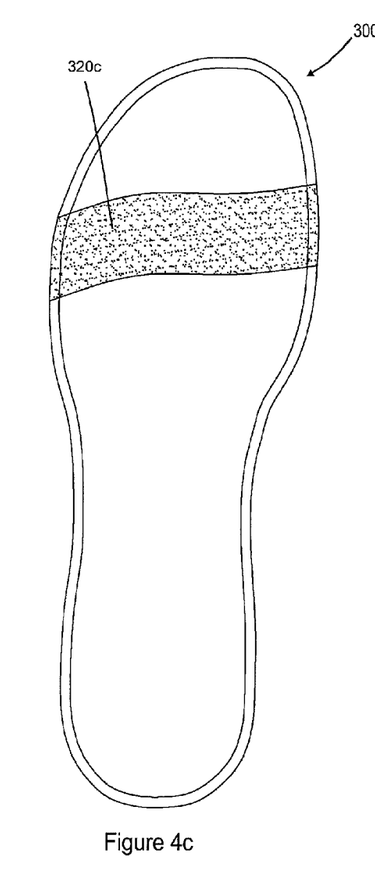
FIG. 4c is a plan view of a third schematic representation of a further embodiment of the present invention.

Referring to FIGS. 4a, 4b and 4c, there are shown embodiments of footwear articles 300a, 300b and 300c having various foot engagement means. FIG. 4a shows a foot engagement means 320 typical of that of a "flip-flop", FIG. 4b shows an "cross-over" type engagement means and FIG. 4c shows a single-strap type foot engagement means 320c. Those skilled in the art will appreciate that numerous types of foot engagement means are applicable without departing from the scope of the invention.

Figure 5A:
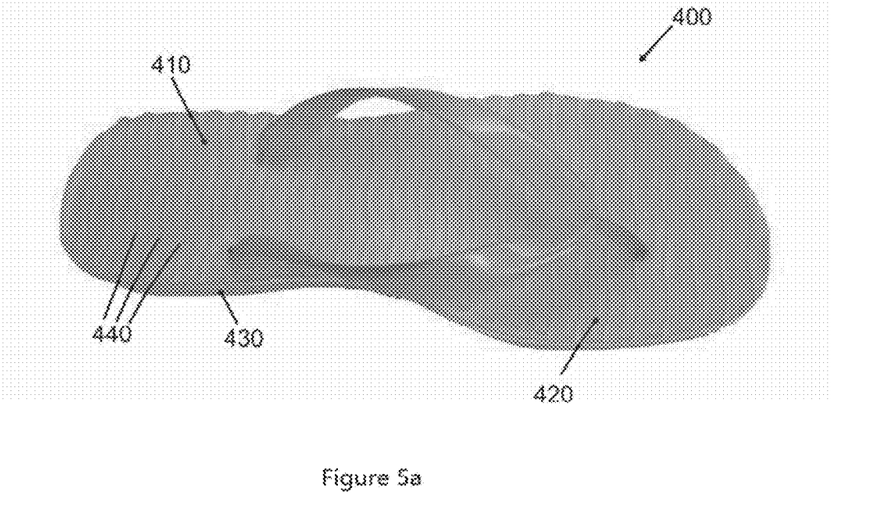
FIG. 5a depicts another embodiment of a footwear article according to the present invention.

Referring to FIG. 5a, there is shown another embodiment of a footwear article 400 according to the present invention. In the present embodiment, the first portion 410 extends along the entire length of the article 400 so as to provide the entire upper surface 420. In this embodiment, the first portion 410 again is formed from a gel material so as to provide dampening to the foot of a user upon impact, in combination with an expanded polymeric foam of which the second portion 420 is formed.

Further, in the present embodiment, elongate grooves 440 extend laterally across the upper surface 420 of the article 400. The grooves 440 allow for localized deformation of the first portion 410, which provides for additional dampening to the foot of a user during use. Furthermore, the laterally extending grooves 440 also provide a "grip" effect which prevents slippage of the foot of a user against the other surface 420 during use.

Figure 5B:
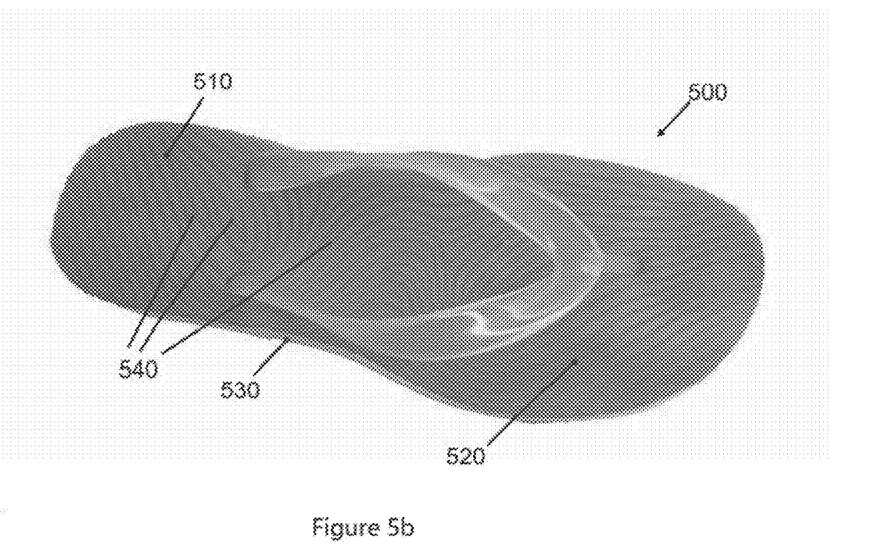
FIG. 5b depicts a further embodiment of a footwear article according to the present invention.

Referring to FIG. 5b, there is shown a further embodiment of a footwear article 500 according to the present invention. Similarly as in the embodiment depicted in FIG. 5a, the first portion 510 extends the entire length of the footwear article 500 so as to form the entire upper surface 520. Again, the second portion is provided by an expanded polymeric material 520 of foam form which extends the entire length of the article 500.

In the present embodiment, grooves 540 are provided which, similarly as in the embodiment depicted in FIG. 5a, allow for localized deformation of the first portion 510, and due to the gel like properties, and further incorporation with the expanded polymeric properties of the second portion 530, the grooves 540 allow for additional dampening and cushioning to the foot of a user during use. Furthermore, again the grooves 540 provide a "grip" type effect which reduces slippage of the foot of a user on the upper surface 520 of the article 500 during use.

Figure 6:
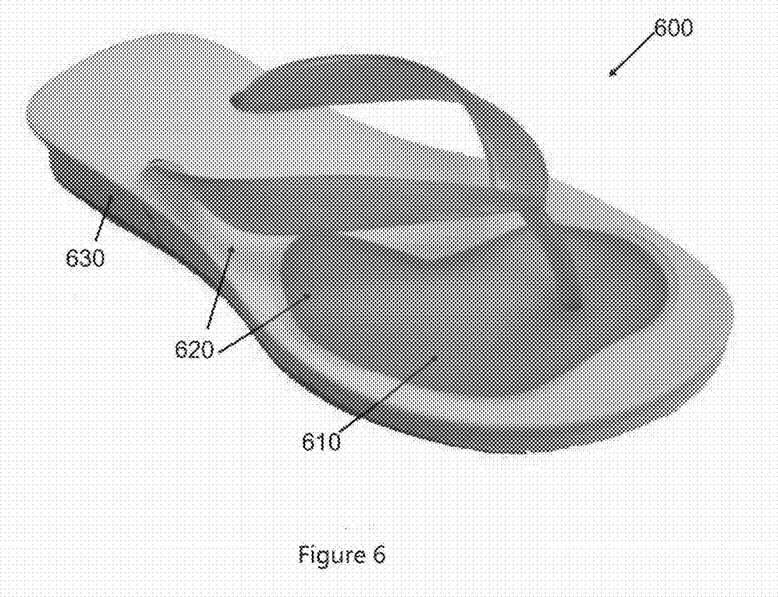
FIG. 6 depicts yet another embodiment of a footwear article according to the present invention.

Referring now to FIG. 6, there is depicted yet a further embodiment of a footwear article 600 according to the present invention. In the present embodiment, the first portion 610, again formed from a gel material, and in this embodiment is provided towards the front portion of the footwear article 600. The first portion 610 forms a part of the upper surface 620, and the second portion 630, again formed from an expanded polymeric material, forms the remaining portion of the upper surface 520.

In the present embodiment, the first portion 610 provides for dampening and shock absorption at the front portion of the foot of a user in use, and furthermore, the first portion being located in this position provides for grip of the foot of a user and prevents slippage along the upper surface 620 in use.

Figure 7A:
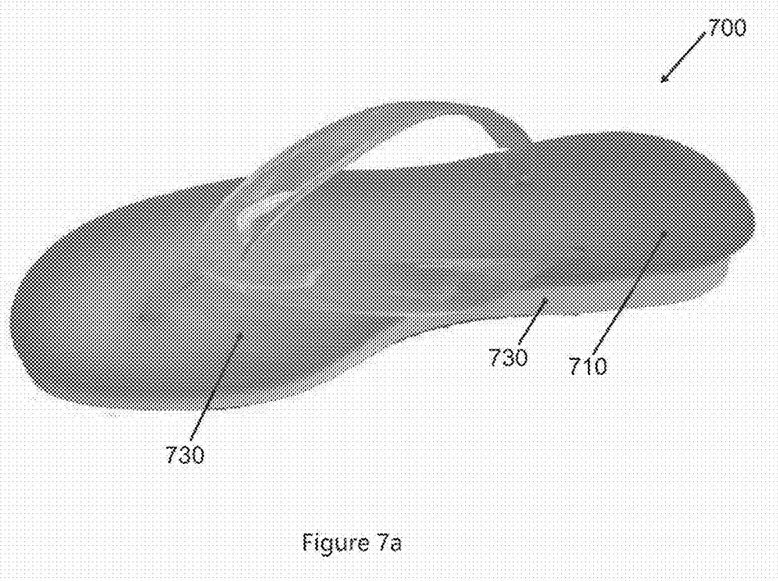
FIG. 7a depicts yet a further embodiment of a footwear article according to the present invention.
Figure 7B:
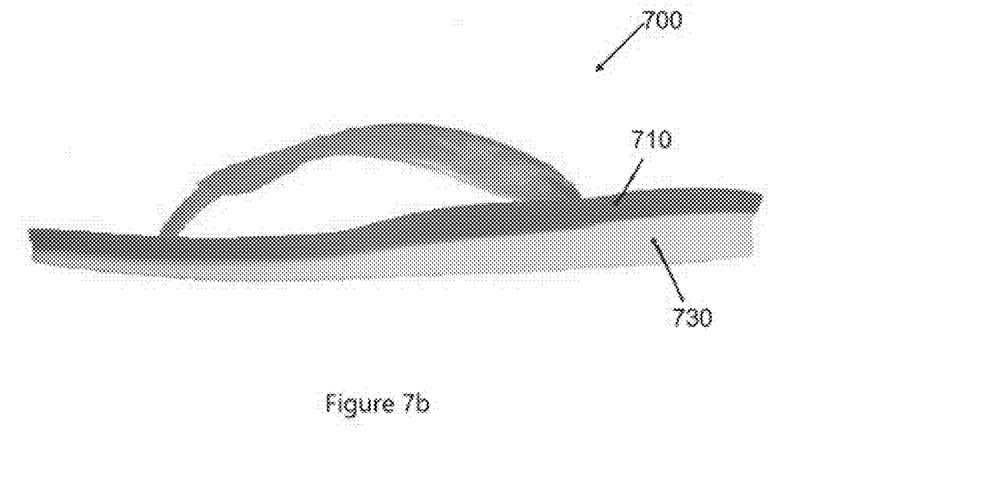
FIG. 7b depicts the embodiment of the footwear article of FIG. 7a in a non-flexed state.
Figure 7C:
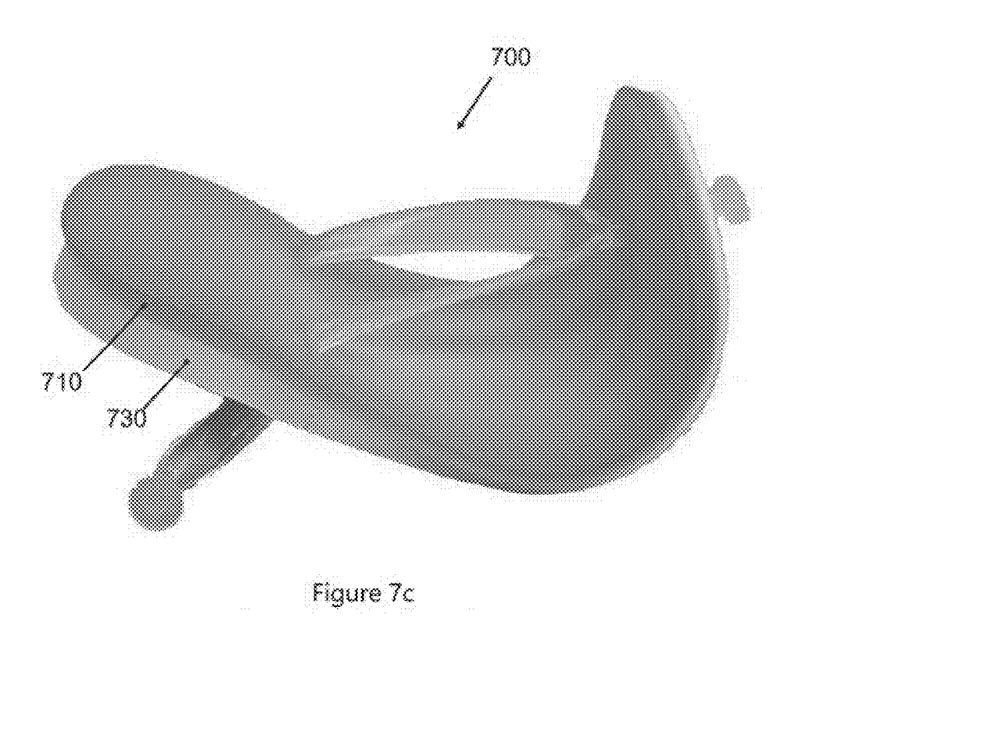
FIG. 7c depicts the embodiment of the footwear article of FIG. 7a in a flexed state.

Referring now to FIGS. 7a, 7b and 7c, there is depicted yet a further embodiment of a footwear article 700 according to the present invention. In the present embodiment, the first portion 710 is provided again in a gel material form, and the second portion 730 is provided in an expanded polymeric form. The first portion 710 extends the entire length of the footwear article 700 so as to form the entire upper surface 720 of the article 700. In the present embodiment and those as depicted in preceding embodiments, the first portion and the second portion are selected from suitable polymeric materials and are suitably sized so as to provide for repetitive flexion of the footwear article as shown in FIG. 7b during use, and so as to provide for resilience or "spring bag" such that the deformation is elastic and the article returns to its rest states as depicted in FIG. 7c. As will be understood and appreciated by those skilled in the art, a footwear article of the type depicted, is exposed to much flexion and bending and thus the first portion and second portion must be able to be maintained together to maintain the structural integrity of the sole.

In reference to the embodiments of the invention as depicted in FIGS. 5a to 7c and as described in the description above, as will be appreciated by those skilled in the art, the footwear articles are provided such that the sole of the article comprises the entire sole of the device, and the foot engagement means merely hold the sole to the bottom of the foot of the user. Such footwear articles are termed different names in different parts of the world, including terms such as "flip flop", "thongs" and "jandals".

As will be understood by those skilled in the art, to provide a flip-flop type footwear article, the article must be extremely flexible so as to allow for continual flexing during walking or ambulation of a person. Such a sole is distinctly different from that of traditional footwear articles, whereby a comparatively small amount of flexion is allowable and typically at one portion of the sole, in comparison with that as required and provided by flip-flop type footwear articles.

As will also be appreciated by those skilled in the art, it is necessary to provide an article which, after many repetitions of flexion, maintains its structural integrity without the first portion and the second portion separating or delaminating. Furthermore, those skilled in the art will appreciate that the sole of a flip-flop device as claimed and shown in the accompanying drawings in accordance with the present invention, only comprises the upper portion and the lower portion as described, the upper portion (i.e. first portion) providing for direct contact with the underside of the foot of a user most often without a sock, and the lower portion (i.e. second portion) engages directly with the grounds or surface upon which a person walks, without the use of additional outer source or the like.

Furthermore, flip-flop type footwear, as will readily be understood and appreciated by those skilled in the art, are often exposed to harsh environmental conditions such as water and long durations of sunlight due to their typical applications, and the materials from which they are formed and the manner in which the portions are joined, must be capable of withstanding such exposure.

As such, those skilled in the art will appreciate that a substantial difference exists between the sole of the footwear article in the present invention and those of conventional footwear, for which have in the prior art been described as being formed by multiple layers.

It will be appreciated, that as the sole of the present invention is comprised only of the first portion and the second portion, these portions must be securely joined or bonded together securely in a manner, as there exists no outer shoe body whereby an inner sole is still retained within a shoe even if not securely bonded to the inside of a shoe, and also in view of typical applications as discussed above.

The present invention has overcome problems of the prior art such as delamination, so as to provide a footwear article having a sole distinctly different from those of conventional footwear, a sole which must endure significantly larger amounts of flexion and strain, whilst maintaining the structural integrity of the sole. By provision of a "co-molding process" whereby a gel material is co-moulded with a polymeric material which is expanded in a manner so as to provide continuity between the gel-type material and the expanded polymeric material. As such, a unitary sole of a unitary construct has been provided that overcomes practical and longevity problems which may be encountered when utilizing bonding techniques such as used in the prior art. The co-molding process provides for structural integrity and also maintains the bond between the materials throughout angles of flexion of the sole well beyond the amount of flexion that conventional footwear are exposed to. Furthermore, the co-molding process simplifies production so as to allow ease of manufacture and reduction in manual labour, and does not require separate formation of the two portions, and does not require a post-fabrication process for joining the portions.

Thus, the two portions, by being moulded, provides a unitary structure whereby the sole is formed of a "continuous" polymeric material, without the necessity for adhesive and the like, and thus mitigating the incidence of debonding, even throughout repetitive large amounts of flexing. The co-molding process provides for rapid and cost and time effective manufacture, and reduces the amount of material wastage, thus also providing environmental advantages.

While the present invention has been explained by reference to the examples or preferred embodiments described above, it will be appreciated that those are examples to assist understanding of the present invention and are not meant to be restrictive. Variations or modifications which are obvious or trivial to persons skilled in the art, as well as improvements made thereon, should be considered as equivalents of this invention.

Furthermore, while the present invention has been explained by reference to "flip-flop" type footwear articles, it should be appreciated that the invention can apply, whether with or without modification, to other footwear articles without loss of generality.

The invention claimed is:

1. A footwear article comprising:
a generally elongate sole for engagement with and support of the foot of a person, said sole having an upper surface, a lower surface, a first portion being for direct contact and interaction with the underside of the foot of the person and being formed from a first polymeric material having a first density and wherein the first portion forms substantially the entire upper surface of the sole, and a second portion forming substantially the entire lower surface and being for direct contact and interaction with a surface and being formed from a second polymeric material having a second density; and
a foot engagement means for securing the footwear article to the foot of a person and configured so as to extend over a portion of the upper side of the foot of the person;
wherein the first polymeric material is provided in a gel form and the second polymeric material is provided in an expanded form whereby the first density is greater than the second density;
wherein the first polymeric material and the second polymeric material are selected and the first portion and the second portion are sized and arranged such that the sole is substantially flexible and elastic so as to allow for substantial flexion of the sole longitudinally and return, when in use and during ambulation of the person; and
wherein said first portion extends at least to the upper surface of the sole, and the first polymeric material and the second polymeric material are selected and the first portion and the second portion are sized and arranged such that and first portion provides for dampening of load imparted to the foot of the person upon contact with the surface.

2. A footwear article according to claim 1, wherein the first polymeric material and the second polymeric material are selected from the group including thermoplastic polymeric material, co-polymers and mixed polymer blends.

3. A footwear article according to claim 1, wherein the first polymeric material and the second polymeric material are selected from the group including polyurethane, ethylene vinyl acetate, poly vinyl acetate and the like.

4. A footwear article according to claim 1, wherein the first polymeric material is a polyurethane gel and the second polymeric material is an expanded poly vinyl acetate material.

5. A footwear article according to claim 1, wherein said foot engagement means is selected from the group including straps, an enclosure, a buckle or the like.

6. A footwear article according to claim 1, wherein the foot engagement means is a generally elongate and flexible foot engagement and said foot engagement means being engaged directly with at least said second portion.

7. A footwear article according to claim 1, wherein the sole is formed as a unitary co-molded construct provided by the first portion and the second portion.

8. A footwear article according to claim 1, wherein the sole is formed as a unitary construct whereby the first portion and the second portion are joined together by an adhesive bonding agent, contact cement pressure or heat activated film or the like.

9. A footwear article according to claim 1, wherein the first portion extends partially towards the lower surface of the sole.

10. A footwear article according to claim 1, wherein the upper surface is of concave form and the sole includes a peripheral lip extending at least partially along the periphery of the sole so as to provide a contoured upper surface configured to receive the underside of the foot of the person.

11. A footwear article according to claim 1, wherein the article is provided in the form of a "flip-flop" type footwear article wherein the foot engagement means extends from between the first and second toes and extends over the upper side and around both sides of the foot of the user.

12. A footwear article according to claim 1, wherein the article is provided in the form of a "sandal" type footwear article wherein the foot engagement means extends at least laterally over the upper side of the foot of the user.

13. A footwear article according to claim 1, wherein the article is provided as an at least partially enclosed footwear article.

14. A footwear article comprising:
a generally elongate sole for engagement with and support of the foot of a person, said sole having an upper surface, a lower surface, a first portion being for direct contact and interaction with at least a portion of the underside of the foot of the person and being formed from a first polymeric material having a first density, and a second portion forming substantially the entire lower surface and being for direct contact and interaction with a surface and being formed from a second polymeric material having a second density; and
a foot engagement means for securing the footwear article to the foot of a person and configured so as to extend over a portion of the upper side of the foot of the person and wherein the foot engagement means is provided such that the foot of a person is substantially non-enclosed;
wherein the first polymeric material is provided in a gel form and the second polymeric material is provided in an expanded form whereby the first density is greater than the second density;
wherein the first polymeric material and the second polymeric material are selected and the first portion and the second portion are sized and arranged such that the sole is substantially flexible and elastic so as to allow for substantial flexion of the sole longitudinally and return, when in use and during ambulation of the person; and
wherein said first portion extends at least to the upper surface of the sole, and the first polymeric material and the second polymeric material are selected and the first portion and the second portion are sized and arranged such that and first portion provides for dampening of load imparted to the foot of the person upon contact with the surface.

15. A footwear article according to claim 14, wherein the first portion forms substantially the entire upper surface of the sole.

16. A footwear article comprising:
a generally elongate sole for engagement with and support of the foot of a person, said sole having an upper surface, a lower surface, a first portion being for direct contact and interaction with at least a portion of the underside of the foot of the person and being formed from a first polymeric material having a first density, and a second portion forming substantially the entire lower surface and being for direct contact and interaction with a surface and being formed from a second polymeric material having a second density; and
a foot engagement means for securing the footwear article to the foot of a person and configured so as to extend over a portion of the upper side of the foot of the person such that the article is provided as an at least partially enclosed footwear article;
wherein the first polymeric material is provided in a gel form and the second polymeric material is provided in an expanded form whereby the first density is greater than the second density;
wherein the first polymeric material and the second polymeric material are selected and the first portion and the second portion are sized and arranged such that the sole is substantially flexible and elastic so as to allow for substantial flexion of the sole longitudinally and return, when in use and during ambulation of the person; and
wherein said first portion extends at least to the upper surface of the sole, and the first polymeric material and the second polymeric material are selected and the first portion and the second portion are sized and arranged such that and first portion provides for dampening of load imparted to the foot of the person upon contact with the surface.

\* \* \* \* \*

UNITED STATES PATENT AND TRADEMARK OFFICE
CERTIFICATE OF CORRECTION

PATENT NO. : 9,700,099 B2
APPLICATION NO. : 14/721937
DATED : July 11, 2017
INVENTOR(S) : David Fu et al.

It is certified that error appears in the above-identified patent and that said Letters Patent is hereby corrected as shown below:

On the Title Page

Item (60) Continuation of application No. 14/042,229, filed on September 3, 2013:
Change "September 3, 2013" to -- September 30, 2013 --

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*